United States Patent [19]

Mizoguchi

[11] Patent Number: 4,803,438
[45] Date of Patent: Feb. 7, 1989

[54] 8-PHASE PHASE-SHIFT KEYING DEMODULATOR

[75] Inventor: Shoichi Mizoguchi, Tokyo, Japan

[73] Assignee: NEC Corporation, Tokyo, Japan

[21] Appl. No.: 71,108

[22] Filed: Jul. 8, 1987

[30] Foreign Application Priority Data

Jul. 9, 1986 [JP] Japan .............................. 61-161376
Feb. 20, 1987 [JP] Japan .............................. 62-37632

[51] Int. Cl.[4] .......................... H03D 3/18; H03K 9/06
[52] U.S. Cl. ...................................... 329/50; 329/107;
329/110; 329/124; 329/131; 375/86; 375/98;
375/103
[58] Field of Search .................. 329/50, 107, 110, 122,
329/124, 126, 131, 134; 375/83, 86, 98, 99, 101,
102, 103, 104

[56] References Cited

U.S. PATENT DOCUMENTS 4,540,948  9/1985  Ryu ................................ 329/146 X
4,567,599  1/1986  Mizoguchi ........................ 333/18 X
4,703,282 10/1987  Yoshida ............................. 329/50

Primary Examiner—Eugene R. Laroche
Assistant Examiner—David Mis
Attorney, Agent, or Firm—Sughrue, Mion, Zinn, Macpeak & Seas

[57] ABSTRACT

In order to rapidly bring a 8-phase phase shift keying demodulator into resynchronization upon the demodulator going out of synchronism, a plurality of error signals produced within the demodulator is used to determine whether a signal point of an incoming 8-phase phase modulated signal is usable for controlling a transversal filter. An asynchronism signal, which indicates whether the demodulator is synchronized, is derived from the demodulator and being applied to a tap gain control signal generator coupled to the transversal filter. The tap gain control signal generator is controlled when the asynchronism signal indicates asynchronism of the demodulator.

10 Claims, 12 Drawing Sheets

WAVEFORM OF
DEMODULATED SIGNAL
BEFORE
FULL-WAVE RECTIFICATION

WAVEFORM OF
DEMODULATED SIGNAL
AFTER
FULL-WAVE RECTIFICATION a': REFERENCE LEVELS OF
    $E_{pu}, E_{qu}, E_{ru}, E_{su}$ b': REFERENCE LEVELS OF
    $E_{pl}, E_{ql}, E_{rl}, E_{sl}$ $a'$: REFERENCE LEVELS OF $E_{pu}$, $E_{qu}$ $b'$: REFERENCE LEVELS OF $E_{p\ell}$, $E_{q\ell}$ a, b : REFERENCE LEVEL a, b : REFERENCE LEVEL a,b: REFERENCE LEVEL a,b: REFERENCE LEVEL

8-PHASE PHASE-SHIFT KEYING DEMODULATOR

BACKGROUND OF THE INVENTION

1. Field of the Invention

This invention relates generally to an 8-phase Phase-Shift Keying (8 PSK) demodulator and more specifically to such a demodulator featuring an improved function by which resynchronization can be achieved in a shorter time duration as compared with known 8 PSK demodulators. This invention is highly suited for use in a digital radio transmission system.

2. Description of the Prior Art

A digital radio transmission system is susceptible to multipath fading or the like and invites waveform distortion of the transmitted signal, which degrades signal quality and which may cause a short break in transmission reception. In order to minimize these problems, it is the current practice to employ a transversal equalizer using a transversal filter.

The transversal equalizer in a digital radio transmission system, however, has encountered the difficulty that distortion of the transmitted signal is apt to exceed the equalizing capability thereof. More specifically upon the distortion reaching a level at asynchronism of clock and carrier signals in a demodulator is induced and results in asynchronism of the control loop of the transversal filter. These conditions induce signal distortion within the equalizer itself. Therefore, even if the distortion of the transmitted signal again falls within the capability of the equalizer, the synchronized state is not automatically restored in the equalizer A known approach to solving this problem is to reset the tap gain signal generator coupled to the transversal filter to its initial state upon the occurrence of asynchronism in the demodulator This prior art approach maintains the equalizer at reset until resynchronism of the clock and carrier in the demodulator occurs. Accordingly, as the equalizer remains inoperative during this time period, the control loop of the equalizer is not brought into synchronization unless the waveform distortion of the transmitted signal is lowered to a considerable extent.

It is therefore highly desirable to have a transversal equalizer restored to its normal state as quickly as possible upon the distortion of the transmitted signal being reduced to a level at which the equalizer is able to perform its function To this end, intermittent resetting of a transversal filter has been proposed in U.S. Pat. No. 4,567,599 assigned to the same entity as the instant invention. According to this prior art, when asynchronism is detected in a demodulator, a reset signal is intermittently generated to render the transversal filter operative at intervals during a period in which the transversal filter is paused. This prior art strives to shorten the inoperative duration of the equalizer by discontinuously checking quality recovery of an incoming IF signal through intermittent resetting of the equalizer However, such a negative approach has proven insufficient to effectively shorten the inoperative period of the equalizer.

Further, no 8 PSK demodulator has yet been proposed which is provided with the above-mentioned function plus automatic gain control for maintaining the incoming IF signal to a constant level.

SUMMARY OF THE INVENTION

It is an object of this invention to provide an 8 PSK demodulator equipped with a transversal equalizer, which features an improved function by which resynchronization can be achieved in the minimum amount of time.

It is another object to provide an 8 PSK demodulator equipped with a transversal equalizer, which is provided with improved resynchronization function plus automatic gain control for maintaining an incoming IF signal to a constant level.

In general terms the present invention provides a 8-phase shift keying demodulator which features a rapid resynchronization upon the demodulator going out of synchronism. A plurality of error signals are produced within the demodulator, which error signals are used to determine whether a signal point of an incoming 8-phase modulated signal is usable for controlling a transversal filter An asynchronism signal, which indicates whether the demodulator is synchronized, is derived from the demodulator and being applied to a tap gain control signal generator coupled to the transversal filter. The tap gain control signal generator is controlled when the asynchronism signal indicates asynchronism of the demodulator.

More specifically, the present invention takes the form of an 8-phase phase-shift keying demodulator comprising: a transversal equalizer for equalizing an incoming 8-phase phase modulated signal; first means coupled to the transversal filter and coherently demodulating the equalized signal; second means for generating a plurality of error signals, the transversal equalizer including a transversal filter and a tap gain control signal generator coupled to the transversal filter; third means for receiving the plurality of error signals and determining whether a signal point of the 8-phase phase modulated signal is usable for controlling the transversal equalizer, the third means producing a first output; fourth means for detecting asynchronism of the demodulator, the fourth means applying a second output to the tap gain control signal generator; and fifth means interposed between the third means and the tap gain control signal generator, receiving the first output and controlling the tap gain control signal generator when the second output indicates asynchronism of the demodulator.

BRIEF DESCRIPTION OF THE DRAWINGS

The features and advantages of the present invention will become more clearly appreciated from the following description taken in conjunction with the accompanying drawings in which like blocks or signals are denoted by like reference numerals and in which.

DETAILED DESCRIPTION OF THE PREFERRED EMBODIMENTS

Figure 1:
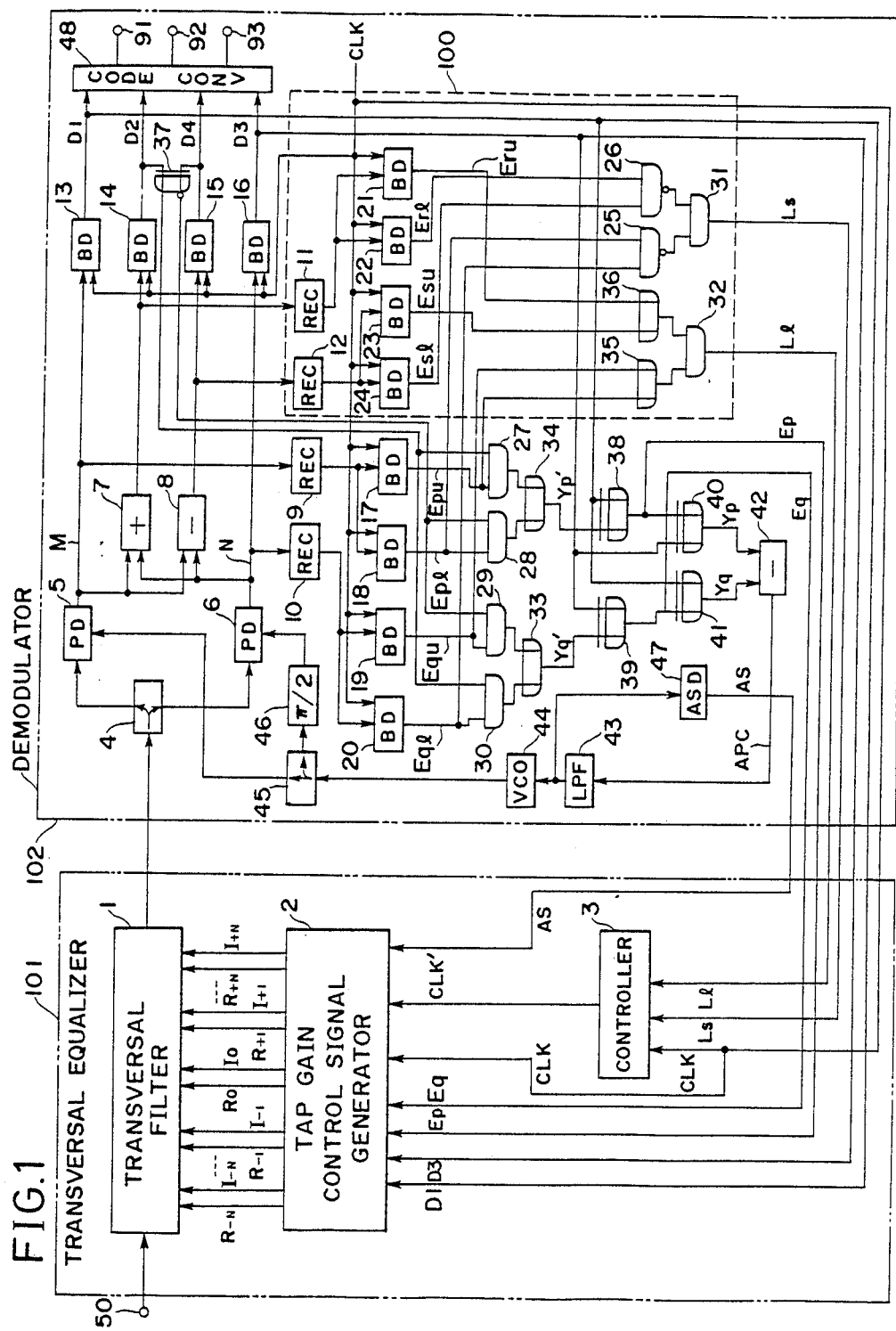
FIG. 1 is a block diagram showing a first embodiment of this invention.

Reference is now made to FIG. 1, wherein a first embodiment of this invention is shown in block diagram form. The FIG. 1 embodiment features provision of three blocks 3, 47 and 100 in a known 8 PSK demodulator disclosed in U.S. Pat. No. 4,540,948 assigned to the same entity as the instant application.

Before discussing the first embodiment in detail, an 8 PSK demodulator to which this invention is applicable will first be described.

In FIG. 1, an 8-phase phase-modulated IF (Intermediate Frequency) signal is applied via an input terminal 50 to a transversal filter 1 which forms part of a transversal equalizer 101. The equalizer 101 further includes a tap gain control signal generator 2 and a controller 3. The transversal equalizer is provided to prevent the degradation of signal quality by eliminating intersymbol interference caused by the variations of channel transmission characteristics due to fading, for example.

The transversal filter 1 includes a tapped delay line (not shown) which is assumed to have (2N+1) taps in this case (N=a positive integer). The output of each tap is weighted by a variable gain factor in response to the corresponding control signal $R_{-N}, \ldots, R_O, \ldots, R_{+N}$, $I_{-N}, \ldots, I_O, \ldots$ or $I_{+N}$. These control signals are supplied from the tap gain control signal generator 2.

The transversal equalizer 101 supplies its output to two phase detectors (PD) 5 and 6 via a signal distributer or splitter 4. A voltage-controlled oscillator (VCO) 44 applies its output to the phase detectors 5 and 6 by way of a signal distributer 45, wherein the input to the phase detector 6 has been phase shifted in a phase shifter 46 by $\pi/2$ radians. The IF signal from the transversal equalizer 101 is coherently or synchronously demodulated by the phase detectors 5 and 6, which respectively apply their outputs (viz., baseband signals M and N) to binary decision circuits (BD) 13 and 16 and further to an adder 7 and a subtracter 8. The outputs of the adder 7 and the substracter 8 are fed to binary decision circuits 14, 15, respectively. Note that the outputs of the adder 7 and the subtracter 8 are advanced in phase by $\pi/4$ and $3\pi/4$ relative to the output of the phase detector 5. The binary decision circuits 13 through 16 respectively generate data signals D1, D2, D4 and D3 which are fed to a code converter 48. The converter 48 produces three channel data on its three output terminals 91, 92 and 93 in a manner well known in the art.

In order to control both VCO 44 and transversal filter 1, the outputs of the phase detectors 5, 6, the adder 7, the subtracter 8, and the binary decision circuits 13 through 16 are utilized.

The demodulated baseband signal M from the phase detector 5 is fed to a full-wave rectifier 9. This rectifier 9 supplies its output to two binary decision circuits 17 and 18, which produce respectively error signals Epu and Epl. Similarly, the demodulated baseband signal N from the phase detector 6 is fed to a full-wave rectifier 10. This rectifier 10 supplies its output to binary decision circuits 19 and 20, which produce error signals Equ and Eql, respectively. The binary decision circuits 14 and 15 applies their outputs to an Exclusive-OR gate 37 which applies its inverted output to AND gates 28, 29, and its non-inverted output to AND gates 27, 30. The four error signals Epu, Epl, Equ and Eql are fed to the AND gates 27, 28, 29 and 30, respectively. An OR gate 33 receives the outputs of the AND gates 29, 30 and supplies its output Yq' to an Exclusive-OR gate 39. This gate 39 further receives the data signal D3 and produces an error signal Eq. Likewise, an OR gate 34 receives the outputs of the AND gates 27, 28 and supplies its output Yp' to another Exclusive-OR gate 38. This gate 38 is further supplied with the data signal D1 and produces an error signal Ep. The Exclusive-OR gates 40 and 41 respectively produce signals Yp and Yq, which are applied to a subtracter 42. The output of the subtracter 42 is applied via a low-pass filter (LPF) 43 to the VCO 44 as an automatic phase control (APC) signal, and allows the VCO 44 to recover a carrier wave. The above-mentioned control route is referred to as an APC loop. In the above, application of a clock signal CLK has not been described for simplicity.

The tap control signal generator 2 is supplied with the error signals Ep, Eq and the data signals D1, D3 and a clcck signal (in the case of the prior art), generating a plurality of tap gain control signals $R_{-N}, \ldots, R_O, \ldots, R_{+N}, I_{-N}, \ldots, I_O, \ldots$ and $I_{+N}$. The transversal filter 1 receives these tap gain control signals and minimizes intersymbol interference.

The FIG. 1 blocks hitherto described are disclosed in the aforesaid U.S. Pat. No. 4,540,948 and hence further description thereof will not be given for brevity.

As shown in FIG. 1, an asynchronism detector 47 is interposed between the low-pass filter (LPF) 43 and the tap gain control signal generator 2. This detector 47 detects the impedance variation of the APC loop, and outputs an asynchronism signal AS which indicates if the carrier wave is out of synchronism in the demodulator 102 or not.

The FIG. 1 arrangement further comprises an effective region determination circuit 100, which comprises two full-wave rectifiers 11, 12, four binary decision circuits 21 through 24, two NAND gates 25, 26, two OR gates 35, 36, and two AND gates 31, 32, which are coupled as shown. The full-wave rectifier 11 is supplied with the output of the adder 7, and applies its output to the binary decision circuits 21 and 22. Another full-wave rectifier 12 receives the output of the subtracter 8 and applies its output to the binary decision circuits 23 and 24. The binary decision circuits 21, 22, 23 and 24 generate error signals Eru, Erl, Esu and Esl, respectively. The NAND gate 25 receives the error signals Epl and Eql, while the NAND gate 26 receives the error signals Er; and Esl. The OR gate 35 receives the error signals Epu and Equ, while the OR gate 36 receives the error signals Eru and Esu. The AND gate 31 is supplied with the outputs of the NAND gates 25 and 26, and outputs a small level control signal Ls. On the other hand, the AND gate 32 receives the outputs of the OR gates 35 and 36, and outputs a large level control signal Ll. The small and large level control signals Ls and Ll are given by the following logic equations:

$$Ls = (\overline{Epl} + \overline{Eql}) \cdot (\overline{Erl} + \overline{Esl}) \quad (1)$$
$$= \overline{(Epl \cdot Eql)} \cdot \overline{(Erl \cdot Esl)}$$

$$Ll = (Epu + Equ) \cdot (Eru + Esu) \quad (2)$$

wherein · and + denote AND and OR operations, respectively. The control signals Ls and Ll are applied to the controller 3. The control signals Ls and Ll will be discussed in detail with reference to FIG. 3.

Figure 2A:
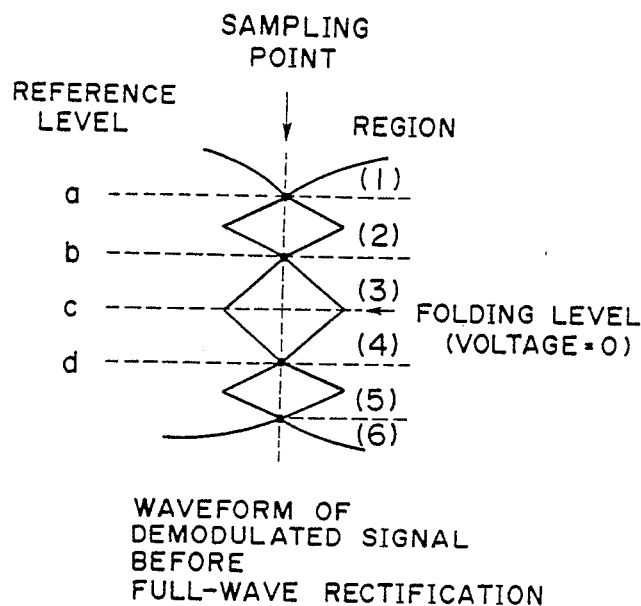
FIG. 2(A) is a waveform of a demodulated signal before full-wave rectification.
Figure 2B:
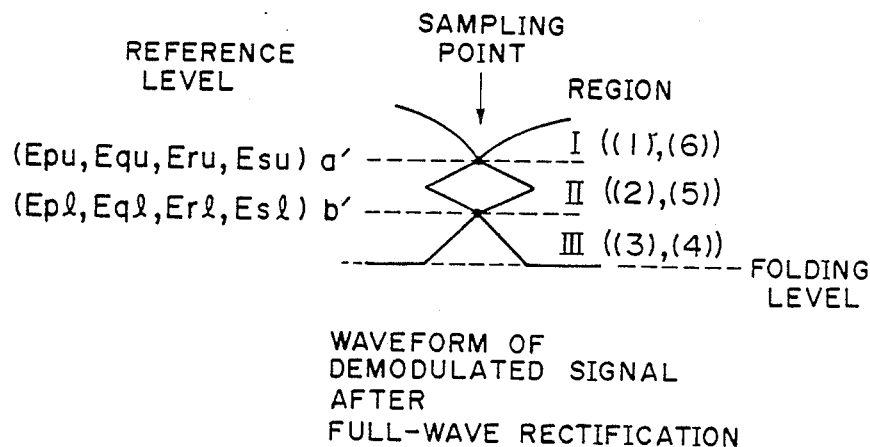
FIG. 2(B) is a waveform of a demodulated signal after full-wave rectification.

Reference is made to FIG. 2 which illustrates, in part (A) and (B) thereof, waveforms of the demodulated signal before and after being full-wave rectified at 9 to 12 (FIG. 1). Each demodulated baseband signal, applied to the full-wave rectifiers 9 to 12, is a 4-value signal whose values are defined by four reference levels "a", "b", "c" and "d" and which has six regions (1), (2), (3), (4), (5) and (6). On the other hand, each full-wave rectified signal (2-value signal) has two reference levels "a'" and "b'" by which the error signals Epu, Equ, Eru, Esu, Epl, Eql, Erl and Esl are specified at the corresponding binary decision circuit. As shown, in part (B) of FIG. 2, regions I, II and III respectively correspond to the groups of regions ((1), (6)), ((2),(5)) and ((3),(4)). The following table shows the relationship between the eight error signals and the logic values of the six regions (1) through (6) from which the error signals are specified.

TABLE

| Region | Error Signal | |
|---|---|---|
| | Epu, Equ Eru, Esu | Epl, Eql Erl, Esl |
| (1) | 1 | 1 |
| (2) | 0 | 1 |
| (3) | 0 | 0 |
| (4) | 0 | 0 |
| (5) | 0 | 1 |
| (6) | 1 | 1 |

It should be noted that each full-wave rectifier (9, 10, 11 or 12) of the first embodiment is AC (Alternate Current) coupled to the corresponding binary decision circuit.

Figure 3:
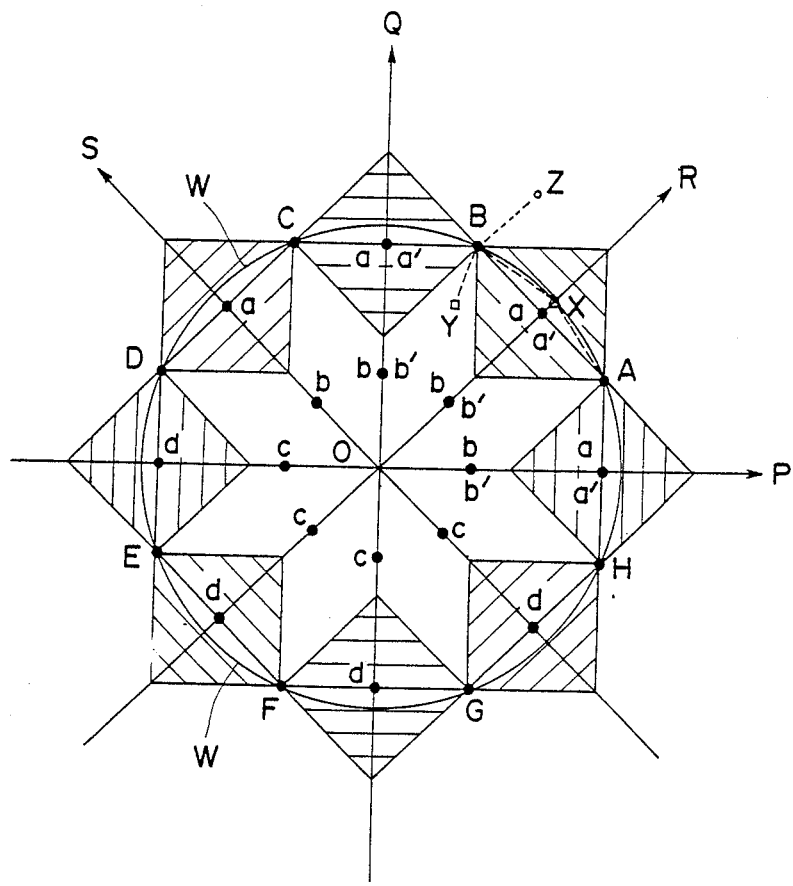
FIG. 3 is a phase diagram of an incoming demodulated IF signal which depicts the operation of the first embodiment.

FIG. 3 is a phase diagram which shows signal points of an incoming 8-phase phase modulated IF signal and "effective regions". This term "effective region" is used throughout this specification in the sense as to indicate a phase region wherein any signal point shifted thereto can be used to control the equalizer. The reference levels referred to in FIG. 2 are also added to FIG. 3 to facilitate an understanding of how these effective regions are defined. It will be understood to those skilled in the art that the effective regions of the first embodiment are the non-hatched ones in view of equations (1) and (2) and the following description.

As shown in FIG. 3, four phases P, Q, R and S define eight phase regions, and eight points A through H represent normal points of an incoming IF signal. The normal signal points of the IF signal are deviated or shifted by intersymbol interference. Let it be assumed that the normal signal point B is shifted to a signal point X, the point X is not suitable to produce the error and data signals according to which the equalizer is controlled. This is because the point X is located equidistant from the normal signal points A and B. In other words, it can not be specified whether the deviated signal point X belongs to the normal point A or B. Accordingly, such a signal point should not be used to produce the error and data signals for controlling the equalizer. Generally, any point shifted into the hatched regions must be neglected in terms of equalizer control.

On the other hand, assuming that the normal point B is deviated to a point Y within a circle W and outside the hatched region, the information that the point Y is within the effective region is provided by the small level control signal Ls. It is reasonable to use such a signal point for controlling the equalizer in that it can be estimated with high probability that the signal point Y has been shifted from the normal point B. This can also apply to the case that the normal signal point B is shifted to a point Z located outside both the circle W and the hatched region. The information that the signal point Z is located within the effective region is provided by the large level control signal Ll.

Figure 4:
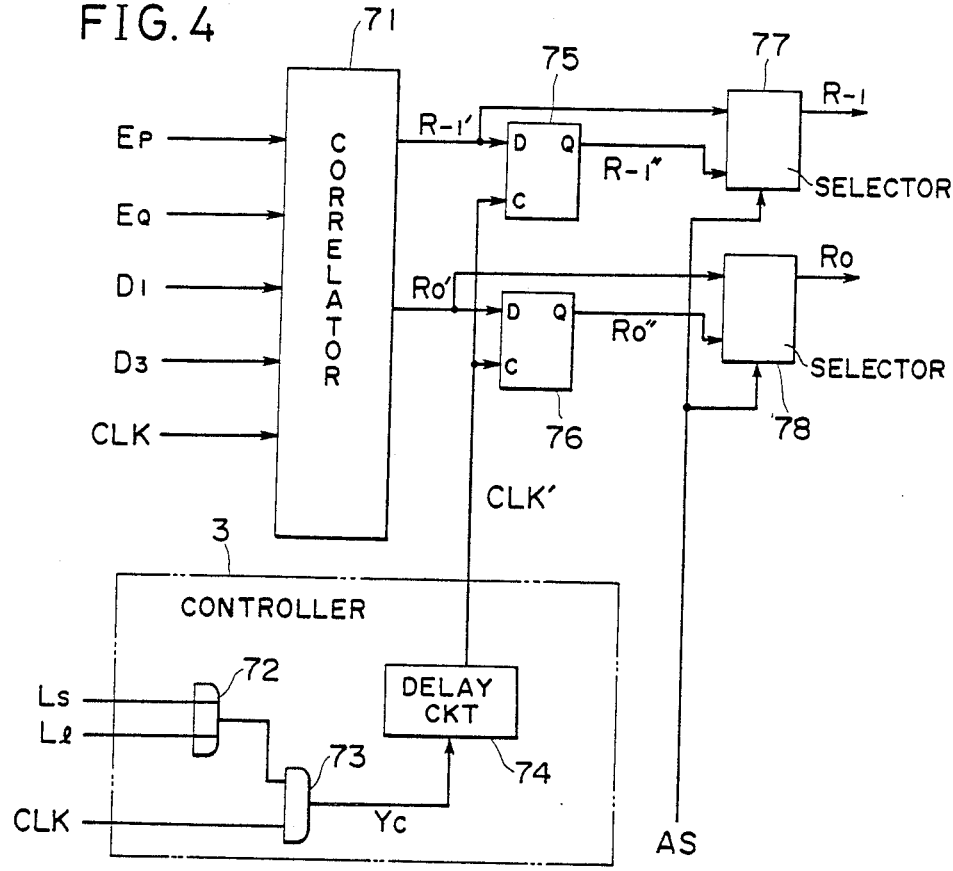
FIG. 4 is a block diagram showing in detail part of the arrangement shown in FIG. 1.
Figure 5:
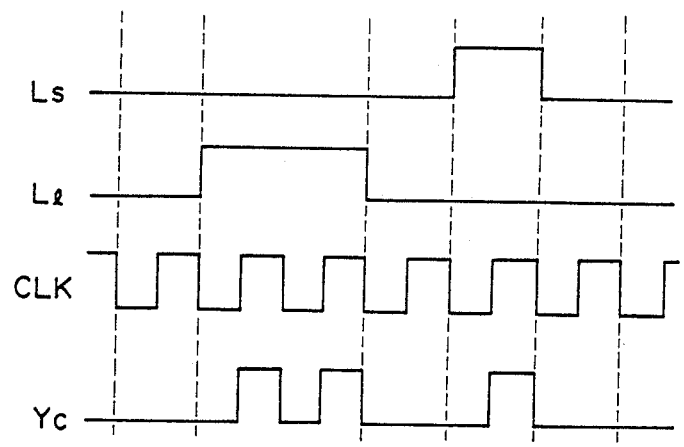
FIG. 5 is a time chart for describing the operation of the arrangement shown in FIG. 4.

FIG. 4 is a block diagram showing part of the tap gain control signal generator 2 (viz., the portions for generating the tap control signals $R_{-1}$ and $R_0$) and the detailed arrangement of the controller 3, while FIG. 5 is a timing chart showing the relationship between the signals Ls, Ll, Yc and the clock signal CLK.

The tap gain control. signal generator 2 shown in FIG. 4 comprises a correlator 71, two D flip-flops 75, 76, and two selectors 77, 78. On the other hand, the controller 3 comprises an OR gate 72, an AND gate 73 and a delay circuit 74. The signals Ls and Ll from the effective region determining circuit 100 are applied to the OR gate 72. The AND gate 73 receives the output of the OR gate 72 and the clock signal CLK, and applies its output Yc to the delay circuit 74. The circuit 74 provides the applied signal Yc with delay in order to compensate for delay of the signals $R-1'$, $R0'$ provided by the correlator 71, and applies its output (clock signal CLK') to the clock terminals of the flip-flops 75, 76.

The correlator 71 receives the error signals Ep, Eq, the data signals D1, D3 and the clock signal CLK, and supplies its outputs $R_{-1}'$, $R_0'$ to the data input terminals D of the filp-flops 75, 76, respectively The flip-flop 75 generates the signal, which has been applied to the data input terminal D, at the output terminal Q in response to the clock signal CLK', and maintains its state until the next clock signal CLK' is applied thereto. The other flip-flop 76 functions similarly so that the detailed description thereof will be omitted. The selectors 77, 78 are responsive to the signal AS applied thereto, and select the outputs of the correlator 71 ($R_{-1}'$, $R_0'$) while the signal AS indicates that the demodulator 102 is in synchronism, and, contrarily, select the outputs of the flip-flops 75, 76 ($R-1''$, $R0''$) as long as the signal AS indicates that the demodulator 102 is out of synchronism. The selectors 77, 78 apply the outputs $R_{-1}$, $R_0$ to the transversal filter 1. In FIG. 4, only two tap gain signals $R_{-1}$, $R_0$ are discussed. However, as will be understood the above discussion is also applicable to the remaining tap gain control signals.

As will be understood from the above, even if the demodulator 102 is out of synchronism, the transversal filter 1 is still controlled using the incoming IF signal whose quality is determined to be useful for controlling the transversal filter 1. This positive algorithm accelerates the recovery of the normal operation of the transversal equalizer, thereby effectively shortening the divergent period of the equalizer.

Figure 6:
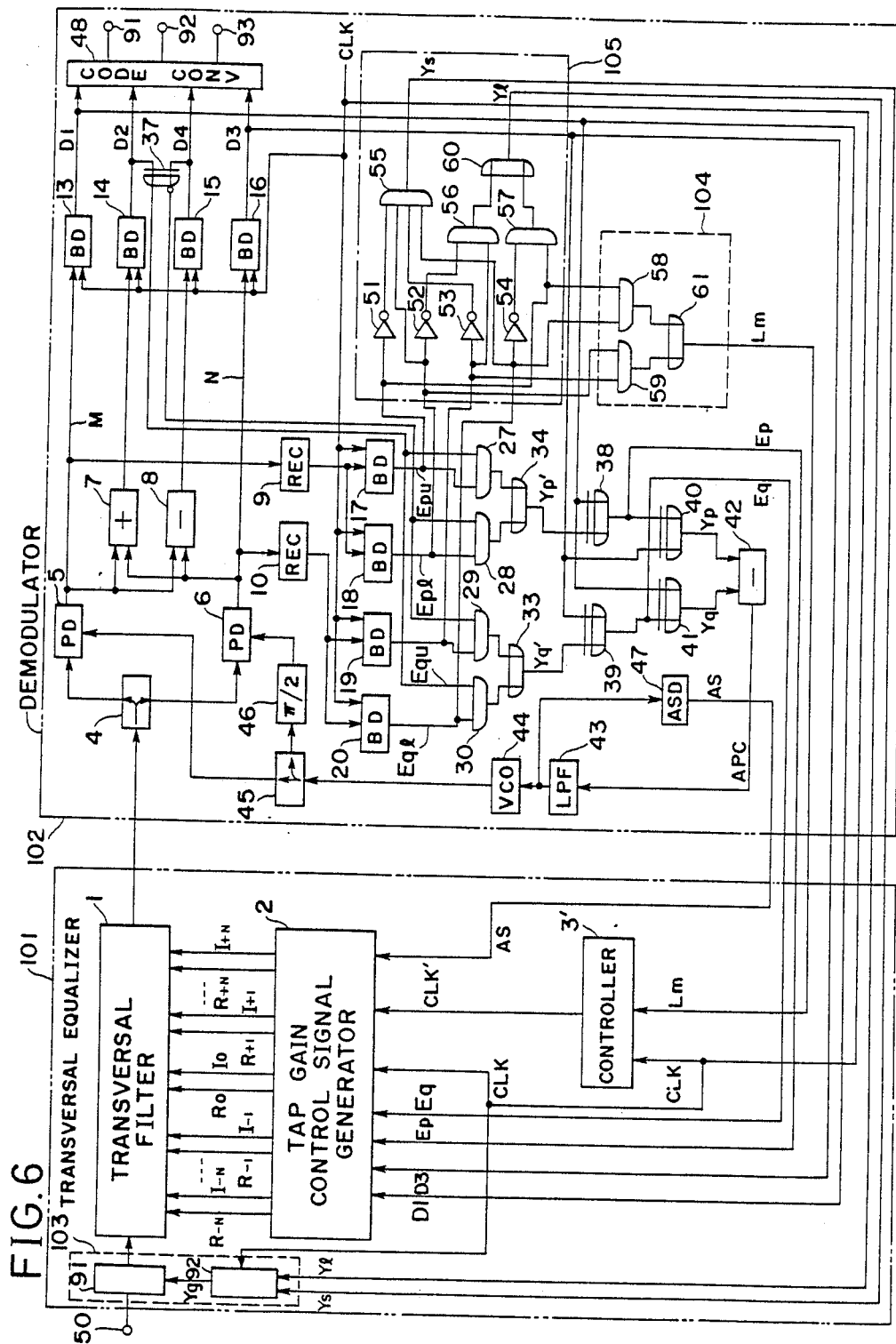
FIG. 6 is a block diagram showing a second embodiment of this invention.

FIG. 6 is a block diagram showing a second embodiment of this invention. The difference between the first and second embodiments is that the latter embodiment comprises an effective region determining circuits 104 and a signal level detector 105 in place of the circuit 100 and further comprises an automatic input level controller 103. Other than this, the second embodiment is equal in arrangement to the first one and hence the description of the portions shared by both embodiments will be omitted. It should be noted that each full-wave rectifier (9 or 10) of the second embodiment is AC coupled to the corresponding binary decision circuit, as in the first embodiment.

The effective region determining circuit 104 comprises two AND gates 58, 59, and an OR gate 61. The AND gate 58 receives the error signals Epu, Eql, while the AND gate 59 the error signals Equ, Epl. The outputs of the AND gates 58, 59 are fed to the OR gate 61 which generates a control signal Lm. The signal Lm indicates whether or not each signal point of the incoming IF signal is located within the effective region shown in FIG. 7 by hatching. The control signal Lm satisfies the following logic equation:

$$Lm = (Epu \cdot Eql) + (Epl \cdot Equ) \tag{3}$$

The control signal Lm is applied to the controller 3.

Figure 7:
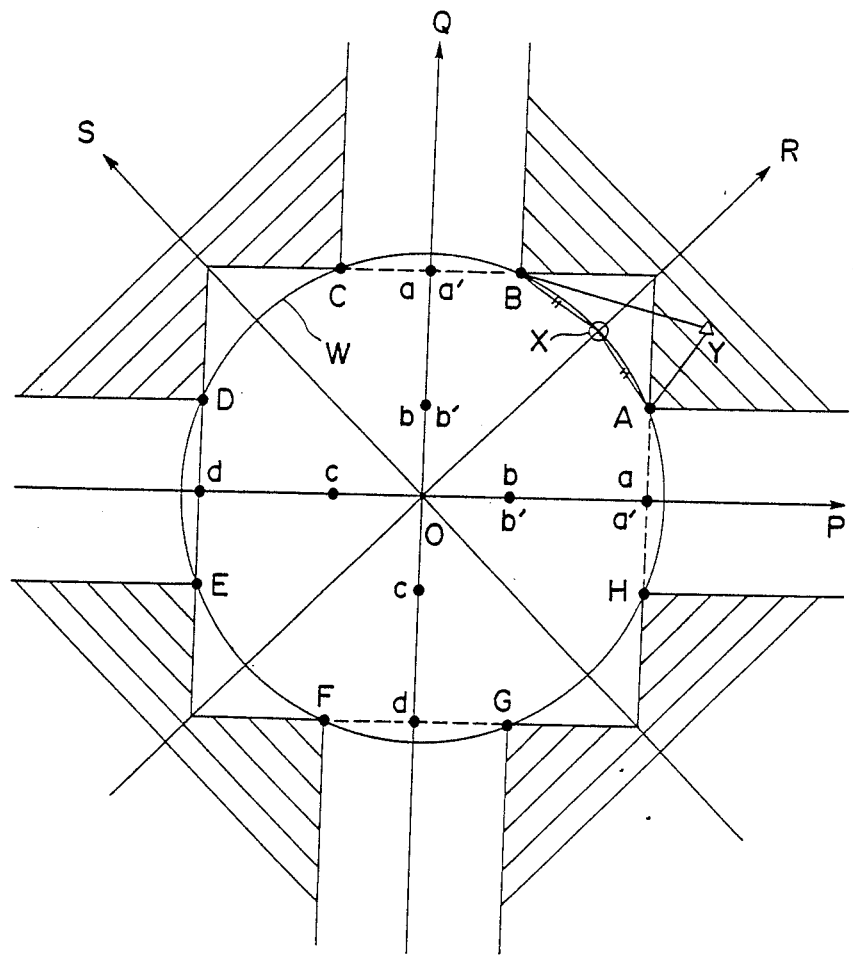
FIG. 7 is a phase diagram of an incoming demodulated IF signal depicting the operation of the second embodiment.

FIG. 7 is a phase diagram which shows the signal points of the incoming 8-phase phase modulated IF signal and the effective regions. The reference levels referred to in connection with FIG. 2 are also added to FIG. 7 for the ease of understanding how the effective regions of this embodiment are defined. It should be noted that effective regions of the second embodiment are the hatched regions. How the effective regions are determined will be understood from equation (3).

In FIG. 7, the phases P, Q, R and S and the normal signal points A to H, have been referred to FIG. 3. For the same reason as in the first embodiment, the signal point shifted to X cannot be used to produce the error and data signals for controlling the equalizer. On the other hand, in the case where the signal point A is deviated to a point Y within the effective region, this situation can be indicated by the control signal Lm. It is reasonable to use the signal point Y for controlling the equalizer in that it can be estimated with high probability that the signal point Y belongs to the normal point A.

Figure 8:
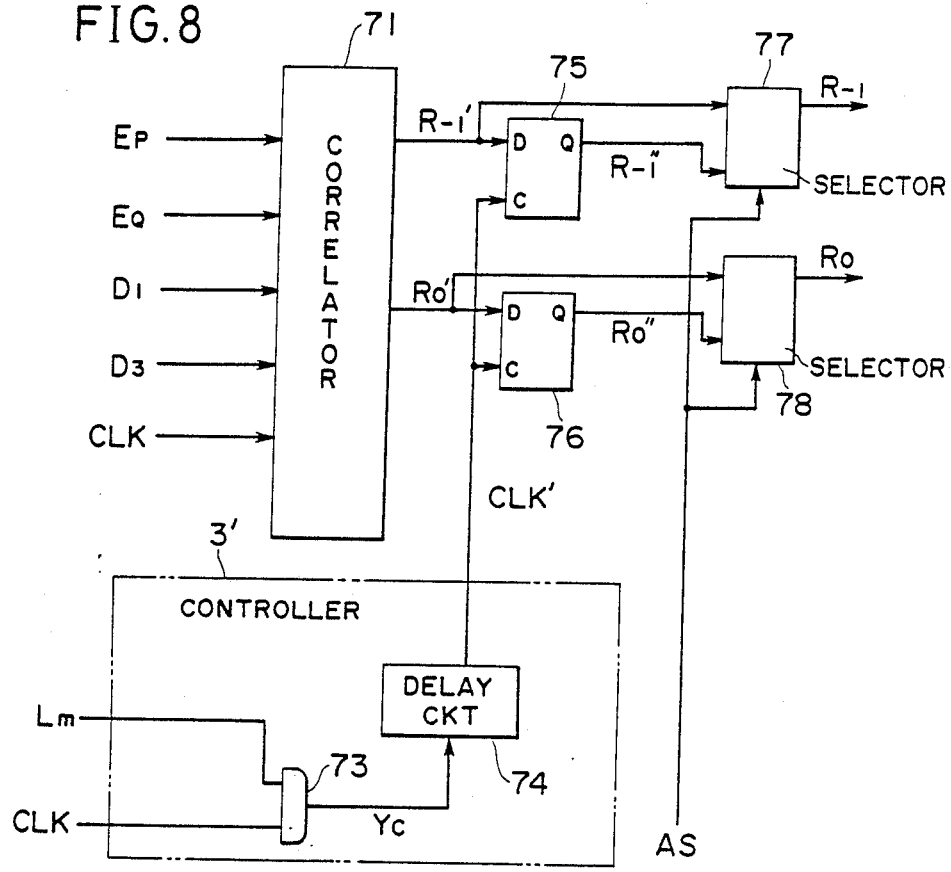
FIG. 8 is a block diagram showing a detail of part of the arrangement shown in FIG. 6.
Figure 9:
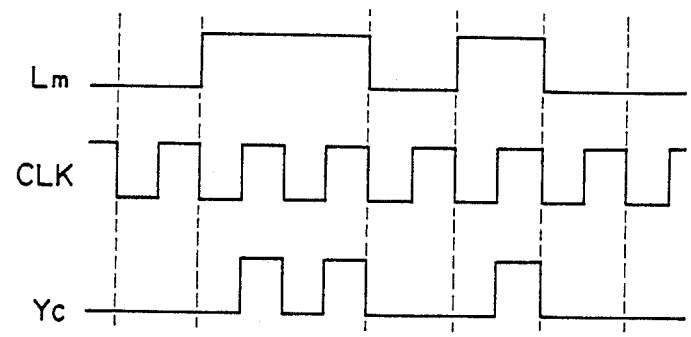
FIG. 9 is a time chart showing the relationship between three signals utilized in the arrangement shown in FIG. 8.

FIG. 8 is a block diagram showing part of the tap gain control signal generator 2 (viz., the portions for generating the tap control signals $R_{-1}$ and $R_0$) and the detailed arrangement of the controller 3', while FIG. 9 is a timing chart of the signals Lm, Yc and the clock signal CLK. FIG. 8 differs from FIG. 4 in that the controller 3' of FIG. 8 is not provided with the OR gate 72 and that the AND gate 73 receives the signal Lm and the clock CLK. Accordingly, in FIG. 9, there is no waveform of the control signals Ls and Ll. The operation of the FIG. 8 arrangement is similar to that of the FIG. 4 arrangement, so that further description thereof will be unnecessary.

The signal level detector 105 (FIG. 6) comprises four inverters 51 to 54, three AND gates 55 to 57, and an OR gate 60. The AND gate 55 receives the error signals Epl and Eql, and the error signals Epu, Equ via the inverters 51, 53, respectively. The AND gate 55 outputs a small level detecting signal Ys. The AND gate 56 receives the error signal Equ, and the error signal Epl via the inverter 52. The AND gate 57 receives the error signal Epu, and the error signal Eql via the inverter 54. The OR gate 60 is supplied with the outputs of the AND gates 56, 57, and outputs a large level detecting signal Yl. The control signals Ys and Yl are represented by the following logic equations:

$$Ys = \overline{Epu} \cdot Epl \cdot \overline{Equ} \cdot Eql \tag{4}$$

$$Yl = (\overline{Epl} \cdot Equ) + (\overline{Eql} \cdot Epu) \tag{5}$$

These signals Ys and Yl are fed to the automatic input level controller 103 which comprises a variable gain amplifier 91 and a variable gain amplifier controller 92.

Figure 10:
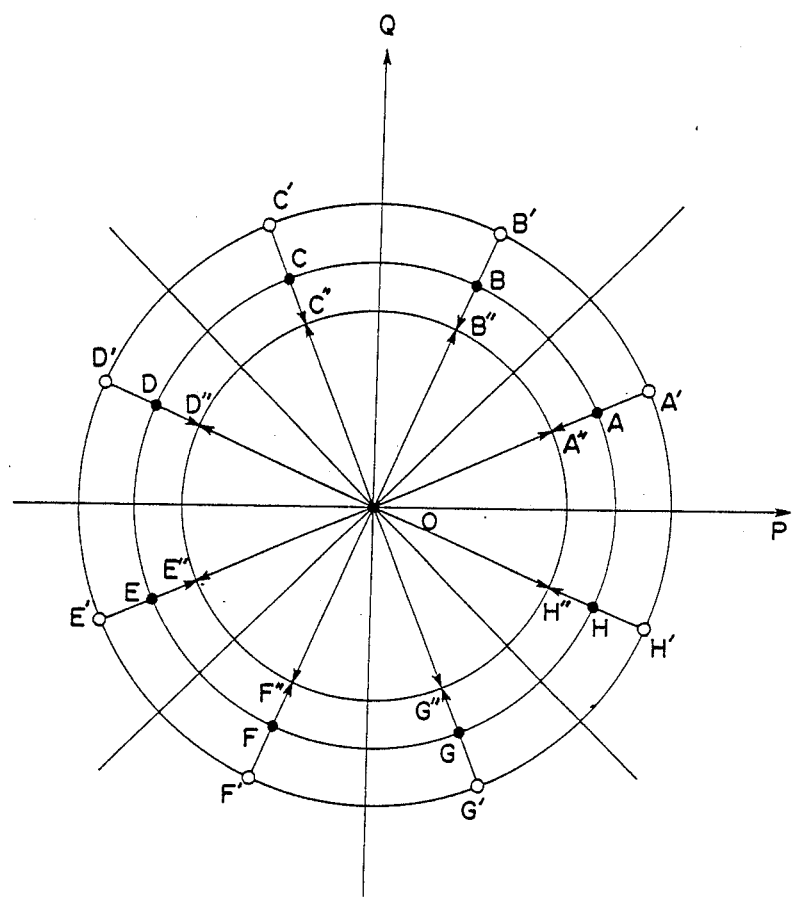
FIG. 10 is a phase diagram of an incoming demodulated IF signal which illustrates the operation of the second embodiment.

FIG. 10 is a phase diagram showing the signal points of the incoming IF signal, wherein the points denoted by A through H are the normal signal points. in the event that the amplitude characteristics of the transmission path or apparatus changes uniformly on the frequency axis, the distant of each signal point from the origin 0 varies, accordingly. For example, the normal signal point A shifts to a point A' when the gain in the transmission path increases, while shifting to a point A' when the gain in the transmission path is reduced. In such a level shift, it may be difficult to produce appropriate data and error signals from the demodulated baseband signals. Therefore, it is necessary to control the amplitude of the demodulated signal to a constant or strictly limited level irrespective of the varied amplitude of the incoming IF signal.

Figure 11:
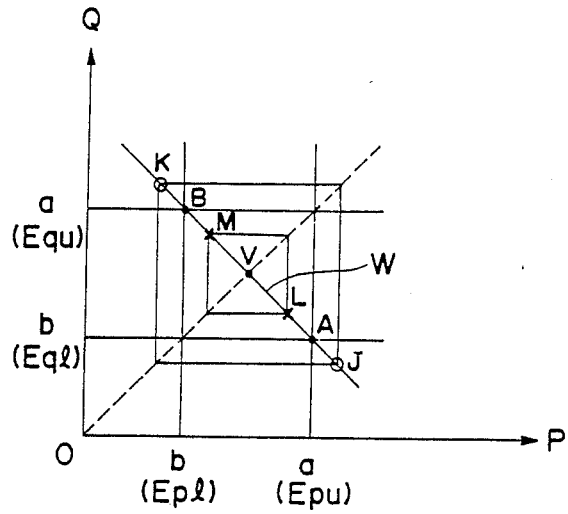
FIGS. 11, 12(A) and 12(B) are illustrations for describing the operation of the second embodiment.

FIG. 11 is a diagram showing location of the signal points of the output of the full-wave rectifiers (9, 10) which are AC coupled to the corresponding binary decision circuit. The signal points of the demodulated signal (M, N), located in the second to fourth quadrants (FIG. 10), are superimposed or folded to the first quadrant when outputted from the binary decision circuit. Accordingly, the signal points A, D, E and H of the demodulated signal (FIG. 10) are positioned at the signal point A in FIG. 11 when outputted from the binary decision circuit. Similarly, the signal points B, C, F and G of the demodulated signal (FIG. 10) are positioned at the signal point B in FIG. 11 when outputted from the binary decision circuit. Likewise, (a) the signal points A', D', E' and H' each having a level higher than the normal level, are positioned at a point J in FIG. 11, (b) the signal points B', C', F' and G' each also having a level higher than the normal level, are positioned at a point K in FIG. 11, (c) the signal points A", D", E" and H" each having a level lower than the normal level, are positioned at a point L in FIG. 11, and (d) the signal points B", C", F" and G" each also having a level lower than the normal level, are positioned at a point M in FIG. 11, when outputted from the binary decision circuit. It is understood that since each full-wave rectifier (9, 10) is AC coupled to the corresponding binary decision circuit, the location of intermediate point V between the points A and B does not change, and each signal point of FIG. 10 is positioned on a line W according to the amplitude thereof.

Figure 12A:
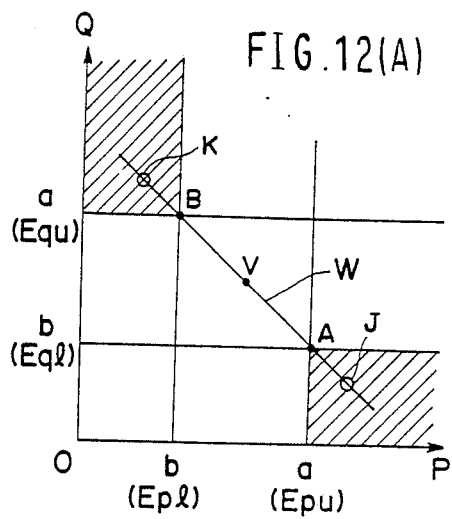
Figure 12B:
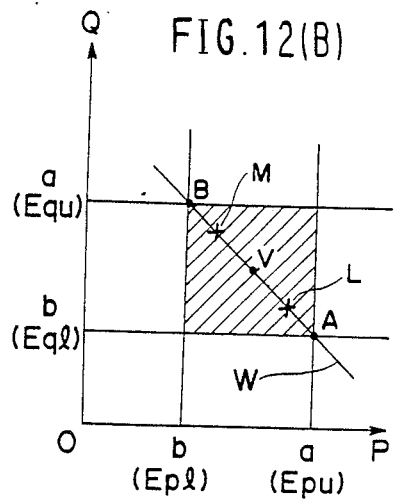

Accordingly, in order to maintain constant the amplitude of the IF signal applied to the transversal filter 1, one of the large or small level detecting signals Yl, Ys is outputted. More specifically, the large level detecting signal Yl is generated when a signal point falls within hatched regions shown in FIG. 12 (part (A)). On the other hand, the small level detecting signal Ys is generated when a signal point is located in hatched regions shown in FIG. 12 (part (B)).

Figure 13:
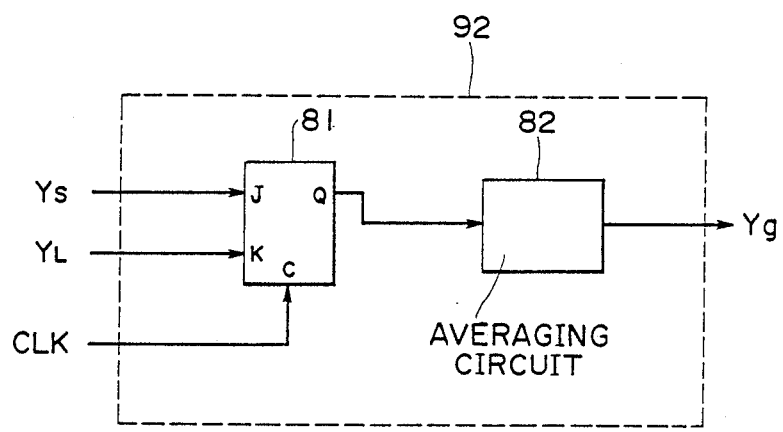
FIG. 13 is a block diagram forming part of the arrangement shown in FIG. 6.

Reference is made to FIG. 13, which shows in block diagram form the detailed arrangement of the variable gain amplifier controller 92. The controller 92 comprises a J-K flip-flop 81 which receives the signals Ys and Yl and the clock signal CLK, and an averaging circuit 82. As well known, a J-K flip-flop outputs logic "1" if clocked when logic "1" is applied to the J input terminal, and outputs logic "0" if clocked when logic "1" is applied to the K input terminal. Accordingly, if the large level detecting signal Y; assumes logic "1" (viz., when large level is detected), the flip-flop 81 produces logic "0" at the output Q. Contrarily, if the small level detecting signal Ys assumes logic "1" (viz., when small level is detected), the flip-flop 81 generates logic "1" at the output Q. The averaging circuit 82 may be an integrator for averaging the output of the flip-flop 81. The output of the flip-flop 81 is applied to the variable gain amplifier of conventional type, and controls the incoming IF signal so that its amplitude is maintained constant.

It is understood from the above that the second embodiment features, in addition to the advantage of the first embodiment, the automatic gain control by which the amplitude of the IF signal is maintained constant when applied to the equalizer. Thus, the levels of the demodulated baseband signal are maintained constant, thereby eliminating a short break or effectively reducing the number thereof in transmission reception.

Figure 14:
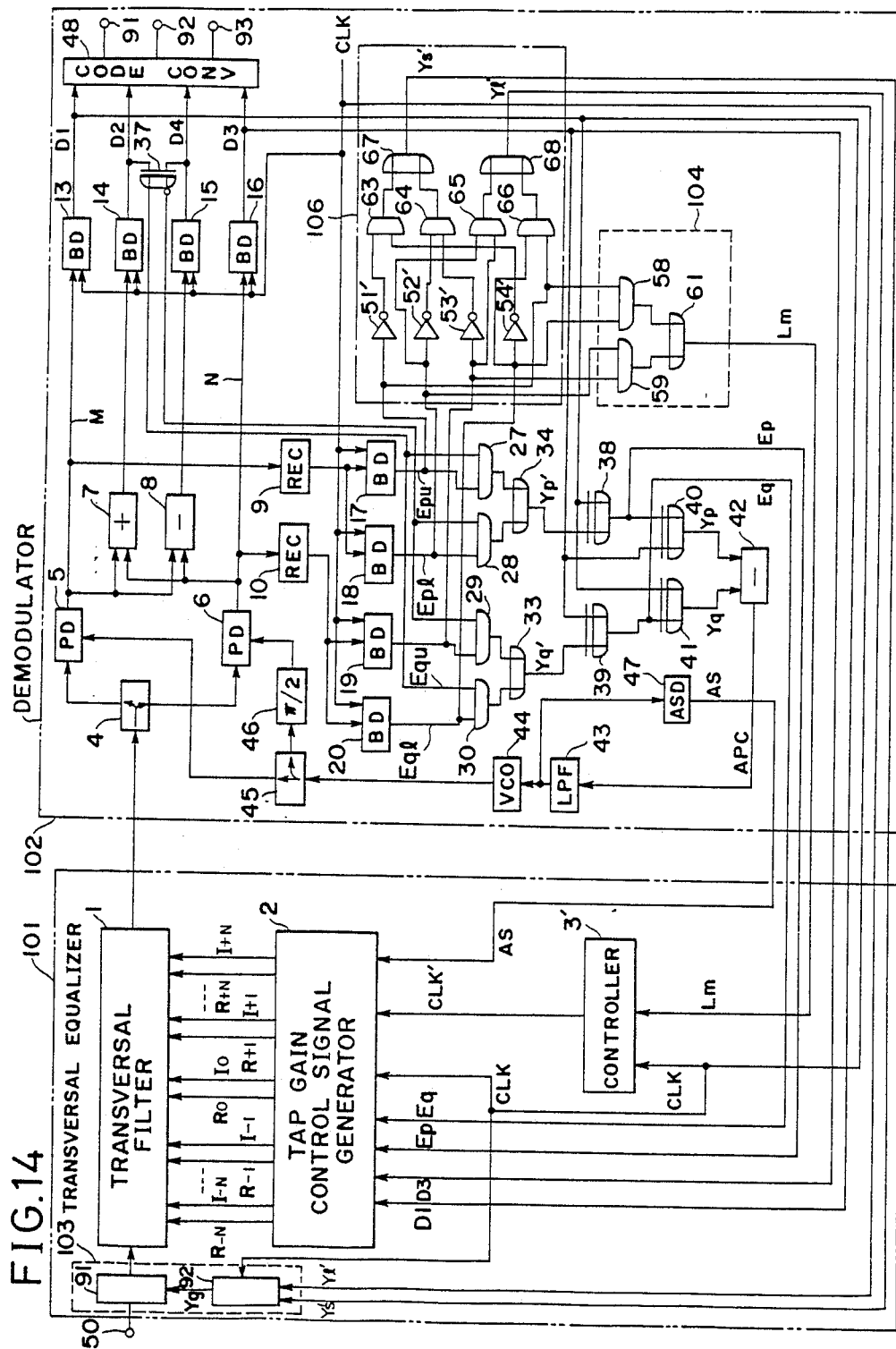
FIG. 14 is a block diagram showing a third embodiment of this invention.

FIG. 14 is a block diagram showing a third embodiment of this invention. The third embodiment is essentially the same as the second one except that (a) each full-wave rectifier of the third embodiment is DC (direct current) coupled to the corresponding binary decision circuit and hence (b) the arrangement of a signal level detector 106 of the third embodiment is different from the counterpart 105 of the second embodiment. Accordingly, the same portions of the second and third embodiments will not be described.

The signal level detector 106 comprises four inverters 51' to 54', four AND gates 63 to 66, and two OR gates 67, 68. The AND gate 63 receives the error signals Epu, Eql via the inverters 51', 54', respectively, while the AND gate 64 receives the error signals Epl, Equ via the inverters 52', 53'. Further, the AND gate 65 receives the error signals Epl, Equ, while the And gate 66 receives the error signals Eql, Equ. The OR gate 67 is supplied with the outputs of the AND gates 63, 64, and generates a small level detecting signal Ys'. On the other hand, another OR gate 68 receives the outputs of the AND gates 65, 66, and generates a large level detecting signal Yl'. The signals Ys' and Yl' are represented by the following logic equations:

$$Ys' = (Epu \cdot Eql) + (Epl \cdot Equ) \quad (6)$$

$$Yl' = (Epu \cdot Eql) + (Eql \cdot Equ) \quad (7)$$

The signals Ys' and Yl' are fed to the automatic input controller 103.

Figure 15:
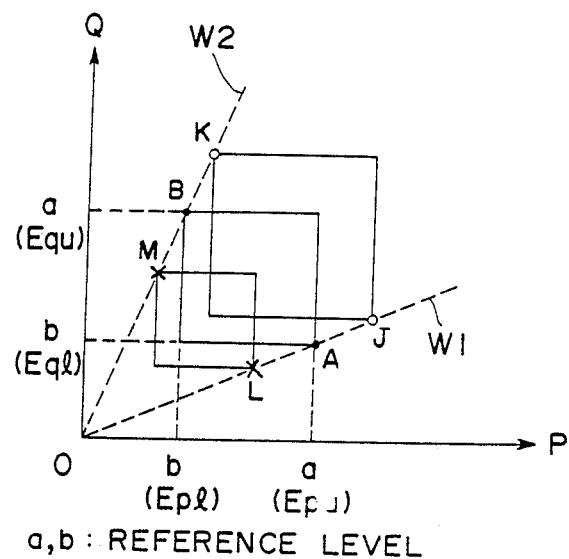
FIGS. 15, 16(A) and 16(B) are illustrations for describing the operation of this invention.

FIG. 15 is a diagram showing location of the signal points of the output of the full-wave rectifiers (9, 10) which are DC coupled to the corresponding binary decision circuits, as mentioned above. The signal points of the demodulated signal (M, N), located in the second to fourth quadrants (FIG. 10), are folded to the first quadrant when outputted from the binary decision circuit. Accordingly, the signal points A, D, E and H of the demodulated signal (FIG. 10) are positioned at the signal point A in FIG. 15 when outputted from the binary decision circuit. Similarly, the signal points B, C, F and G of the demodulated signal (FIG. 10) are positioned at the signal point B in FIG. 15 when outputted from the binary decision circuit. Likewise, (a) the signal points A', D', E' and H' each having a level higher than the normal level, are positioned at a point J in FIG. 15, (b) the signal points B', C', F' and G' each also having a level higher than the normal level, are positioned at a point K in FIG. 15, (c) the signal points A", D", E" and H" each having a level lower than the normal one, are positioned at a point L in FIG. 15, and (d) the signal points B", C", F" and G" each also having a level lower than the normal level, are positioned at a point M in FIG. 15, all when outputted from the binary decision circuit. It is understood that the signal points A and B moves respectively on the lines W1 and W2 when the levels thereof change. This arises from the above-mentioned DC couple between the full-wave rectifiers (9, 10) and the corresponding binary decision circuit.

Figure 16A:
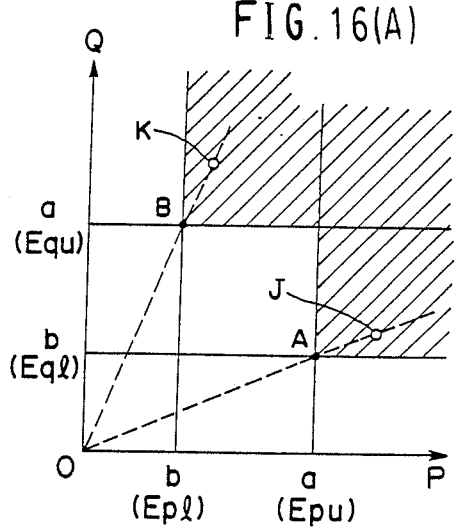
Figure 16B:
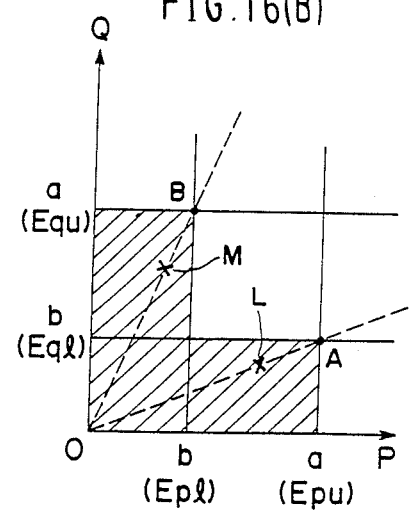

In order to maintain the amplitude of the incoming IF signal to be constant, the large or small level detecting signals Yl', Ys' is generated. More specifically, the large signal detecting signal Yl' is generated when a signal point falls within hatched regions shown in FIG. 16 (part (A)). On the other hand, the small level detecting signal Ys' is generated when a signal point is located in hatched regions shown in FIG. 16 (part (B)).

The foregoing description shows only a selected number of embodiments of the present invention. The various modifications possible without departing from the scope of the present invention which is only limited by the appended claims will be apparent to those skilled in the art.

What is claimed is:

1. An 8-phase phase-shift keying demodulator comprising:
    a transversal equalizer for equalizing an incoming 8-phase phase modulated signal, said transversal equalizer including a transversal filter and a tap gain control signal generator coupled to said transversal filter;
    first means coupled to said transversal filter and coherently demodulating the equalized signal;
    second means for generating a plurality of error signals
    third means for receiving said plurality of error signals and determining whether a signal point of said 8-phase phase modulated signal is usable for controlling said transversal equalizer, said third means producing a first output;
    fourth means for detecting asynchronism of said demodulator, said fourth means applying a second output to said tap gain control signal generator; and
    fifth means interposed between said third means and said tap gain control signal generator, receiving said first output and controlling a plurality of selectors forming part of said tap gain control signal generator when said second output indicates asynchronism of the demodulator.

2. An 8-phase phase-shift keying demodulator as claimed in claim 1, further comprising, sixth means for receiving said plurality of error signal and determining whether a level of said incoming 8-phase phase modulated signal is within a predetermined region according to said plurality of error signals, said six means producing a fourth output; and seventh means coupled to said sixth means, receiving said fourth output and controlling the level of said incoming 8-phase phase modulated signal in response to said fourth output.

3. An 8-phase phase-shift keying demodulator as claimed in claim 1, wherein said second means comprises a plurality of full-wave rectifiers and a plurality of binary decision circuits, said plurality of full-wave rectifiers being AC coupled to said plurality of binary decision circuits.

4. An 8-phase phase-shift keying demodulator as claimed in claim 2, wherein said second means comprises a plurality of full-wave rectifiers and a plurality of binary decision circuits, said plurality of full-wave rectifiers being AC coupled to said plurality of binary decision circuits.

5. An 8-phase phase-shift keying demodulator as claimed in claim 2, wherein said second means comprises a plurality of full-wave rectifiers and a plurality of binary decision circuits, said plurality of full-wave rectifiers being DC coupled to said plurality of binary decision circuits.

6. An 8-phase phase-shift keying demodulator as claimed in claim 1, wherein said first means includes a pair of phase detectors.

7. An 8-phase phase-shift keying demodulator as claimed in claim 2, wherein said seventh means includes a variable gain amplifier for amplifying the incoming 8-phase phase modulated signal, and a variable gain amplifier controller for controlling said variable gain amplifier in response to said fourth output.

8. An 8-phase phase-shift keying demodulator as claimed in claim 7, wherein said variable gain amplifier controller comprises a J-K flip-flop, and an averaging circuit connected to said J-K flip-flop for supplying a control signal to said variable gain amplifier.

9. An 8-phase phase-shift keying demodulator as claimed in claim 1, wherein said tap gain control filter generator further includes a correlator for supplying a plurality of control signals to said transversal filter, and a plurality of memory elements, each of said memory elements receiving a different one of said control signals from said correlator, each of said selectors having its output connected to a respective input of said transversal filter, and each of said selectors having a first input for receiving a different one of said control signals from said correlator and a second input for receiving an output of a different one of said memory elements, each of said selectors being operable for supplying a respective control signal from said correlator to said transversal filter when said second signal indicates synchronism of said demodulator, and being operable for supplying a respective output from said memory elements to said transversal filter when said second signal indicates asynchronism of said demodulator.

10. An 8-phase phase-shift keying demodulator as claimed in claim 9, wherein said memory element is a D-type flip-flop.

* * * * *

UNITED STATES PATENT AND TRADEMARK OFFICE
CERTIFICATE OF CORRECTION

PATENT NO. : 4,803,438

DATED : February 7, 1989

INVENTOR(S) : Shoichi MIZOGUCHI

It is certified that error appears in the above-identified patent and that said Letters Patent is hereby corrected as shown below:

Col. 6, line 48, delete "filp-flops" and insert --flip-flops--
p. 16, line 5

Col. 8, line 21, delete "in" and insert --In--
p. 20, line 11

Col. 9, line 16, delete "Y" and insert --Y$\ell$--
p. 22, line 23

Signed and Sealed this

Twenty-eighth Day of August, 1990

Attest:

HARRY F. MANBECK, JR.

Attesting Officer      Commissioner of Patents and Trademarks